(12) United States Patent
Andros et al.

(10) Patent No.: US 8,776,907 B2
(45) Date of Patent: Jul. 15, 2014

(54) APPARATUS FOR SELECTIVELY REMOVING PLANT PARTS FROM A BED OF PLANTS

(71) Applicants: Matthew James Andros, Santa Margarita, CA (US); Garett John Stapp, San Luis Obispo, CA (US); Thomas Klippenstein, Paso Robles, CA (US)

(72) Inventors: Matthew James Andros, Santa Margarita, CA (US); Garett John Stapp, San Luis Obispo, CA (US); Thomas Klippenstein, Paso Robles, CA (US)

( * ) Notice: Subject to any disclaimer, the term of this patent is extended or adjusted under 35 U.S.C. 154(b) by 0 days.

(21) Appl. No.: 13/621,761

(22) Filed: Sep. 17, 2012

(65) Prior Publication Data

US 2014/0076590 A1    Mar. 20, 2014

(51) Int. Cl.
*A01D 27/00*    (2006.01)

(52) U.S. Cl.
USPC .................................. 171/31; 172/28; 56/13.5

(58) Field of Classification Search
USPC ............ 172/27, 28, 32, 36, 84; 56/13.5, 13.9, 56/14.5, 14.6, 17.2, 17.6, 122–125, 153, 56/500, 504; 171/21, 31, 32, 34, 40, 41
See application file for complete search history.

(56) References Cited

U.S. PATENT DOCUMENTS

| | | | | |
|---|---|---|---|---|
| 1,586,169 A | * | 5/1926 | Webb et al. | 241/79.2 |
| 1,954,593 A | * | 4/1934 | Kuly | 171/17 |
| 2,087,091 A | * | 7/1937 | Joost | 171/46 |
| 2,788,725 A | * | 4/1957 | Wilkey et al. | 172/33 |
| 2,836,026 A | * | 5/1958 | Gray et al. | 56/119 |
| 3,162,003 A | * | 12/1964 | Schapansky | 56/16.5 |
| 3,410,350 A | * | 11/1968 | Ware | 172/32 |
| 4,234,045 A | * | 11/1980 | Porter | 171/14 |
| 4,287,708 A | * | 9/1981 | Neely, Jr. | 56/13.5 |
| 4,416,334 A | * | 11/1983 | Bouillon | 171/27 |
| 4,616,713 A | * | 10/1986 | Shattuck | 172/19 |
| 5,042,240 A | * | 8/1991 | Rocca et al. | 56/16.6 |
| 5,626,195 A | * | 5/1997 | Dover | 172/19 |
| 6,173,559 B1 | * | 1/2001 | Nevarez, Sr. | 56/16.5 |
| 6,363,700 B1 | * | 4/2002 | Fowler | 56/13.9 |
| 6,827,151 B1 | * | 12/2004 | Winslow | 172/32 |

* cited by examiner

*Primary Examiner* — Matthew D Troutman
(74) *Attorney, Agent, or Firm* — R. Scott Kimsey

(57) ABSTRACT

A device for removing plant material from a plant bed. In one embodiment, the device includes a frame with an oscillating cutter attached thereto. The oscillating cutter is disposed such that a cutting portion thereof is beneath the surface of a plant bed when the device is in use. A conveyor is also attached to the frame, the nose of the conveyor being disposed beneath the surface of the plant bed. As the device moves along a plant bed, the oscillating cutter cuts plant material, which is scooped up by the nose of the conveyor and transported to a desired location.

1 Claim, 8 Drawing Sheets

APPARATUS FOR SELECTIVELY REMOVING PLANT PARTS FROM A BED OF PLANTS

RELATED APPLICATIONS

Not Applicable.

BACKGROUND OF THE INVENTION

1. Field of the Invention

The present invention relates generally to the selective harvesting of raspberry, blackberry, and other species and hybrids in the *Rubus* genus, as well as strawberry and other species and hybrids in the *Fragaria* genus. More specifically, the present invention relates to a method and apparatus for removing unwanted plants, or unwanted portions of plants, from a plant bed to facilitate more effective harvesting of the desired plants or portions of plants. While the present invention has application to other species and hybrids in the *Rubus* and *Fragaria* genera, because of the broad application to raspberries and strawberries in particular, application of the present device and method to those plants in particular will be detailed.

2. Background

Raspberry cultivars readily produce new shoots from the roots of the plant. In a planting process called "suckering," new nursery plantings are established by taking advantage of the plant's ability to produce these suckers. Commercial nurseries grow plants and harvest roots to supply the plantable rootstocks to fruit growers. As the plants destined for rootstock go dormant in the fall, they are harvested. Prior to the root harvesting process, the dormant plants are mowed down to a height that leaves only a short length of cane protruding from the surface of the planted bed of soil. This short length of cane and the associated woody portion of plant material that forms the transition from cane to roots, the "crown," is left in the bed and is currently harvested along with the roots. Current practice requires that these crowns be removed as a secondary operation in the packing shed. The crown removal process is currently performed manually. This is a time-consuming and expensive process. The present invention eliminates this secondary operation by removing the crowns from the planted bed before the roots are harvested.

Strawberry plant-stocks are grown in a different fashion. "Mother" plants are planted in rows. The mother plants produce multiple stolons called runners. These horizontal runners are sent outward from the base of the strawberry plants. At variable distances, new strawberry plants (daughter plants) form at the runner nodes. This is possible due to the strawberry plant's ability to form adventitious specialized roots at the nodes along a runner. Wherever these roots touch nutritious soil, they will continue to grow into that soil and establish a new clonal plant or daughter plant that is genetically identical to the mother plant that originally formed the runners. These vegetatively propagated plants are later harvested to be sold to commercial growers producing fruit for consumption.

As with raspberries, strawberries share the common problem of relying on harvesting systems that harvest all the plant material, including the undesirable mother plant. Currently, standard practice is to remove these mother plants as a secondary operation during the cleaning, grading, and packaging process prior to putting plants into cold storage. This is an expensive process that is currently done by hand. Attempts to automate mother plant removal in the packing shed through the use of technologically advanced sorting systems have proven unsuccessful.

The present invention eliminates the secondary separation operation described above by mechanically removing unwanted mother plants or portions of mother plants, in situ, before the harvesting operation.

SUMMARY OF THE INVENTION

The present invention provides a device for removing plant material from a plant bed. In one embodiment, the device includes a frame with an oscillating cutter attached thereto. The oscillating cutter is disposed such that a cutting portion thereof is beneath the surface of a plant bed (i.e. beneath the raspberry crown or strawberry mother) when the device is in use. A conveyor is also attached to the frame, the nose of the conveyor being disposed beneath the surface of the plant bed. As the device moves along a plant bed, the oscillating cutter cuts plant material, which is scooped up by the nose of the conveyor and transported to a desired location.

In another aspect of the invention, a draper wheel is provided, rotatably attached to the frame between the oscillating cutter and the conveyor nose. The draper wheel rotates so as to urge the plant material onto the conveyor.

In another aspect of the invention, a grinder is provided, attached to the frame at an end of the conveyor opposite the conveyor nose. The plant material travels along the conveyor and is deposited into the grinder.

Still another aspect of the invention provides a ground following wheel rotatably attached to the frame, the ground following wheel traveling along the surface of a plant bed when the device is in use. The height of the ground following wheel is linked to the height of the oscillating cutter so that when the height of the ground following wheel changes there is a corresponding change in the height of the cutter.

In still another embodiment of the invention, the cutter oscillates in the direction of travel of the device.

In another embodiment of the invention, the device includes a hydraulically-actuated cylinder mounted to the frame for controlling the amount of force applied to the ground-following wheel, and thereby controlling the depth of the oscillating cutter.

In another embodiment of the invention, the device includes one or more rotary brushes for sweeping debris from the plant bed and into the furrow.

In another embodiment of the invention, the device includes a disc hiller for cutting and removing plant material from the plant bed.

DETAILED DESCRIPTION OF THE INVENTION

Embodiments of the disclosed apparatus provide a method to eliminate the currently required secondary operation of removing unwanted plant material (raspberry crowns, for example), as well as unwanted plants (strawberry mother plants, for example) from post-harvested plant material being processed into commercially available rootstocks and plant stocks. The selective harvest methodologies developed through use of the present invention have applications across the full spectrum of plant production, including commercial growers, nursery operations, and retail/wholesale outlets that sell plants to the hobby farm and gardening/home improvement market.

Current planting practices orient strawberry mother plants or raspberry roots along a bed of prepared soil as a plant line or pair of plant lines. This linear organization of the raspberry crowns or strawberry mother plants predisposes them for accurate mechanical removal.

The selective harvesting apparatus utilized in the present invention includes an oscillating blade for undercutting and side-cutting of plant roots, as well as a conveyor for extracting and lifting crowns or plants from the beds and depositing the lifted material into a grinder that converts the plants into small "unharvestable" pieces of plant material, which is then brushed off the bed. A draper wheel helps lift the plant material onto the conveyor. The cutting portion of the apparatus is mounted on a carriage, or frame, that can be adjusted quickly and accurately along the cutters' longitudinal and vertical axes. This provides for accurate, real-time adjustment of the cutter in relationship to plants targeted for cutting.

Accuracy and field capacity can be increased if the harvested plants were originally planted in the soil using a planting system that was controlled with a tractor and/or implement mounted GPS (global positioning system) unit. The baseline generated during the planting process can then be utilized to guide the harvester, enabling cutting clearances that are small and minimize the unwanted harvesting of targeted rootstock and plant stock.

Figure 1:
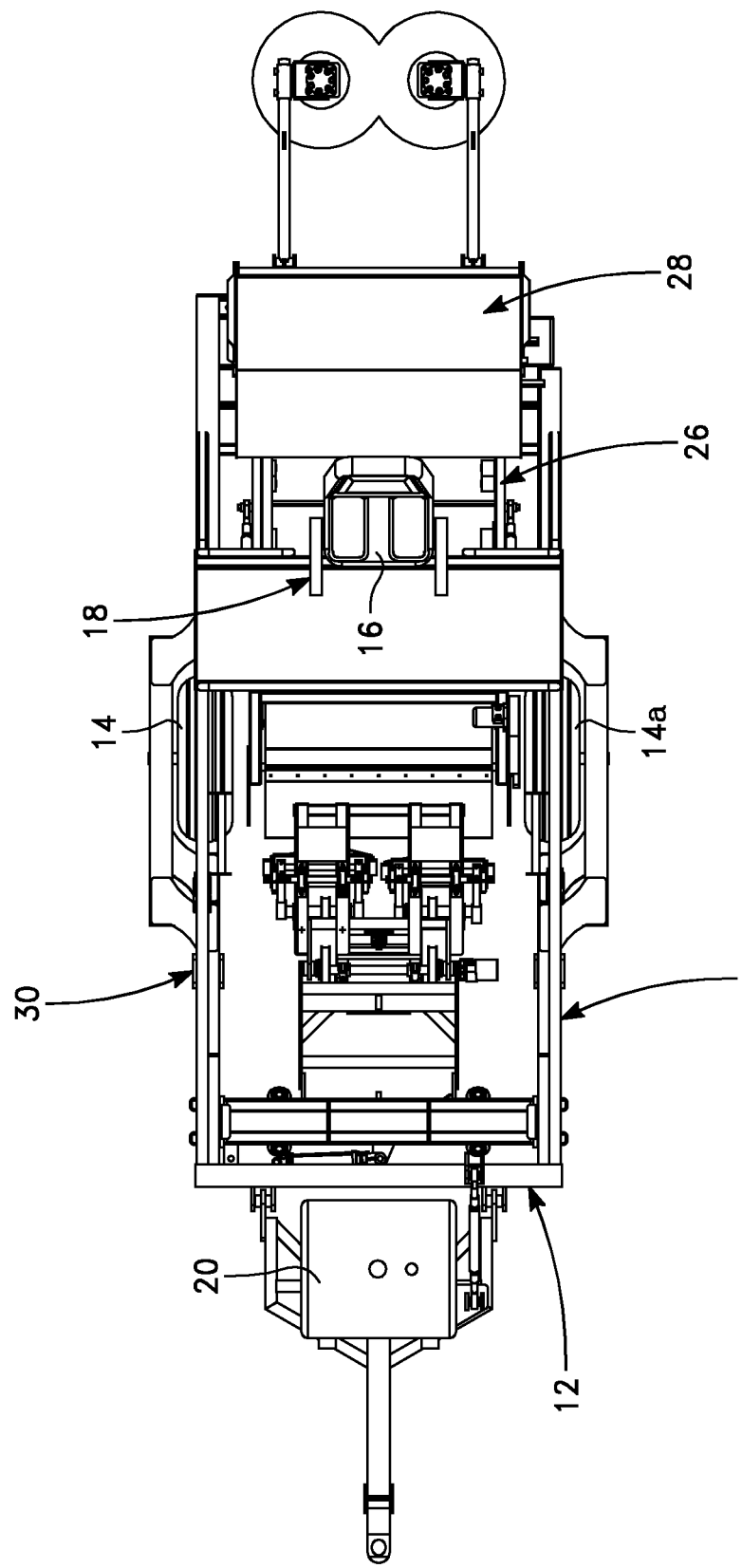
FIG. 1 is a top view of one embodiment of a crown mulcher of the present invention.

Turning to the drawings, wherein like numerals indicate like parts, FIG. 1 is a top view of an exemplary embodiment of a crown mulcher 10 of the present invention. Crown mulcher 10 includes generally a frame 12, gauge wheels 14 and 14a, seat 16, hydraulic oil tank 20, oscillating blades 22 (shown in other Figures), conveyor 26, and grinder 28. Oscillating blades 22 may include one or more blades, and may alternatively be referred to herein as an oscillating cutter). Also not shown in the figures are one or more brushes for brushing plant material from the plant bed and into the furrow.

Frame 12 is preferably constructed of steel and provides a support on which the various other components of the invention are mounted. It should be noted that the design or configuration of frame 12 shown in the Figures is exemplary, and that various modifications to the size, shape, or configuration of frame 12 may be made without departing from the scope of the present invention.

Gauge wheels 14 and 14a are preferably pneumatic tires rotatably mounted to frame 12 and disposed on either side thereof. Gauge wheels 14 and 14a allow crown mulcher 10 to travel along a plant row or bed, and also serve to set the overall ride height of crown mulcher 10. Further, gauge wheels 14 and 14a are preferably used to lift crown mulcher 10 into transport position when it is necessary to transport the device to a job site or to move the device from one job site to another. The overall height of crown mulcher 10 with respect to the ground is adjusted hydraulically, with pivot 30 serving as the point of adjustment to raise or lower frame 12. As frame 12 is raised or lowered, the various components of the present device attached to frame 12 are also raised or lowered.

The hydraulic or other controls of the present invention are utilized by an operator, who may be seated in seat 16 as crown mulcher 10 is in use. Operator controls 18 (not shown) are preferably provided at or near seat 16 so that an operator seated in seat 16 can access them easily. Operator controls 18 can provide any desired functionality, including, but not limited to, controlling the speed of crown mulcher 10, adjusting the height of the device, lateral adjustment of crown mulcher 10, and engaging the conveyor, grinder, draper wheel, brush, and the like.

Various other aspects of the present invention are also preferably controlled hydraulically. These aspects may include the overall ride height of the device, as well as the lateral adjustment of the device. A hydraulic oil tank 20 is preferably provided, secured to frame 12, to provide a reserve supply of hydraulic oil for use with the present invention.

Figure 2:
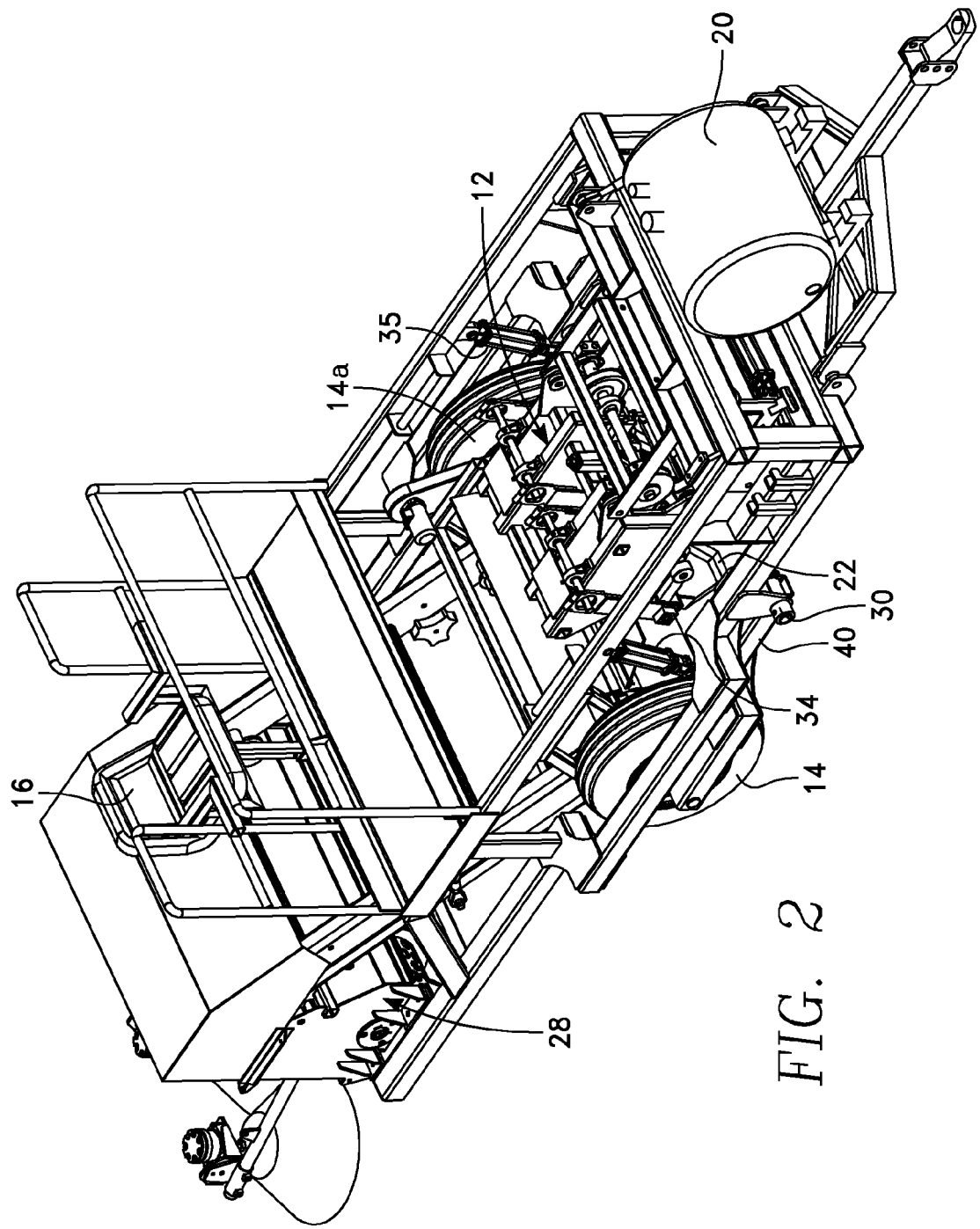
FIG. 2 is a top and side view of one embodiment of a crown mulcher of the present invention.

FIG. 2 shows the embodiment of crown mulcher 10 depicted in FIG. 1 from the top and right side (from the perspective of the operator of the device). One of oscillating blades 22 can be seen in this view.

Oscillating blades 22 serve to undercut the roots of the plants in a bed in which the present device is used. Oscillating blades 22 are attached to frame 12 and positioned such that they travel just beneath the surface of the soil. The precise depth at which oscillating blades 22 travel is variable, and may be adjusted by the operator of the device. The depth of oscillating blades 22 may be adjusted due to changes in plant type among beds, bed height, soil composition, soil softness or firmness, and the like.

The device preferably includes two gauge wheels 14 and 14a, as shown in FIG. 2. One gauge wheel assembly is located on the left side of crown mulcher 10, the other similarly-positioned on the other side of the device. Hydraulic cylinders 34 and 35, attached at one end to the gauge wheel arms 40 and at the opposite end to the frame 12 allow the frame to move up and down with respect to gauge wheels 14 and 14a. It is contemplated that float cylinders 34 and 35 may be locked with respect to one another, such that they raise and lower the height of frame 12 as one. Alternatively, cylinders 34 and 35 may be adjusted independently of one another, such that one side of crown mulcher 10 is raised to a greater or lesser degree than the other. The amount of variation in the two sides of the device may depend on such factors as the shape or slope of the plant bed, and the like. Oscillating blades 22 preferably oscillates in the direction of travel of crown mulcher 10. The speed of oscillation may be varied according to the desires of the operator.

FIG. 2 also provides a view of seat 16, hydraulic oil tank 20, and grinder 28.

Figure 3:
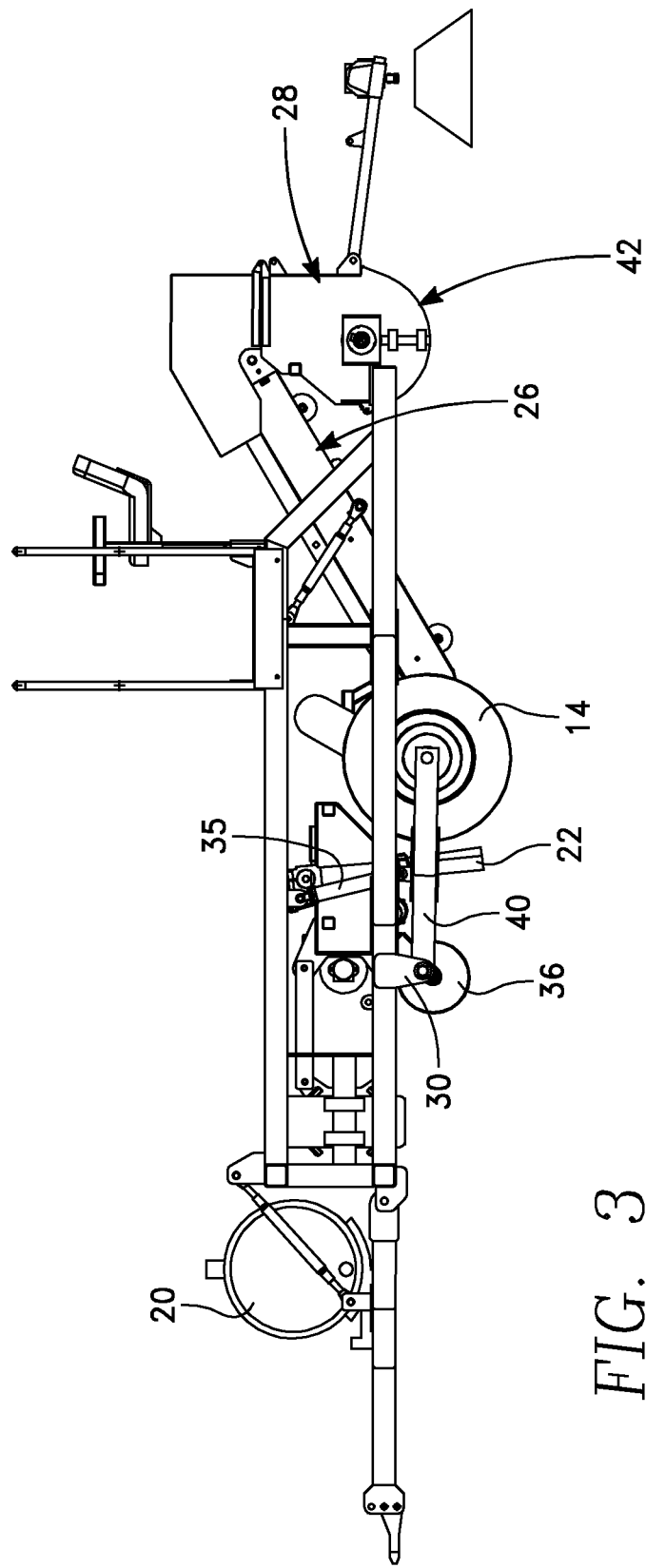
FIG. 3 is a side view of one embodiment of a crown mulcher of the present invention.

FIG. 3 provides a side view of an embodiment of crown mulcher 10. Pivot point 30 of gauge wheel arm 40 is shown, as is gauge cylinder 35. Oscillating blades 22 can also be seen. Ground following wheel 36 is provided ahead (with respect to the direction of travel) of oscillating blades 22. Ground following wheel 36 ensures that oscillating blades 22 remain at the proper depth within the plant bed. As the height of the plant bed varies, rising or falling as crown mulcher 10 moves along its length, ground following wheel 36 moves up and down in conformity with the upper surface of the plant bed. As ground following wheel 36 moves up and down, oscillating blades 22 are raised and lowered within the soil to the same degree.

Ground following wheel 36 also includes parallel links attached to a slider frame. This allows an operator of the device to ensure that crown mulcher 10 remains in proper alignment with respect to the plants in the plant bed.

FIG. 3 also provides a good view of conveyor 26, which carries plant material in an upward direction and deposits it into grinder 28. Once in grinder 28, the material is processed into small, non-harvestable particles. These particles exit grinder 28 through cylinder wall exit 42, then fall to the ground. Cylinder wall exit 42 preferably includes a perforated surface having a plurality of openings through which the particles fall. By varying the size of the openings in grinder exit 42, the operator of crown mulcher 10 can control the size of the particles that leave grinder 28 and fall to the ground.

When non-harvestable particles fall from grinder 28, they fall onto the plant bed. The presence of the debris on the plant bed can interfere with the proper operation of other devices that may travel along the plant bed after the device of the present invention. Thus, in some embodiments of the present invention, one or more brushes are provided to sweep the debris from the plant bed and into the furrow running alongside the plant bed. Any suitable brushes may be used. In some embodiments, for example, rotary brushes may be used to sweep aside the non-harvestable particles and debris on the plant bed.

Figure 4:
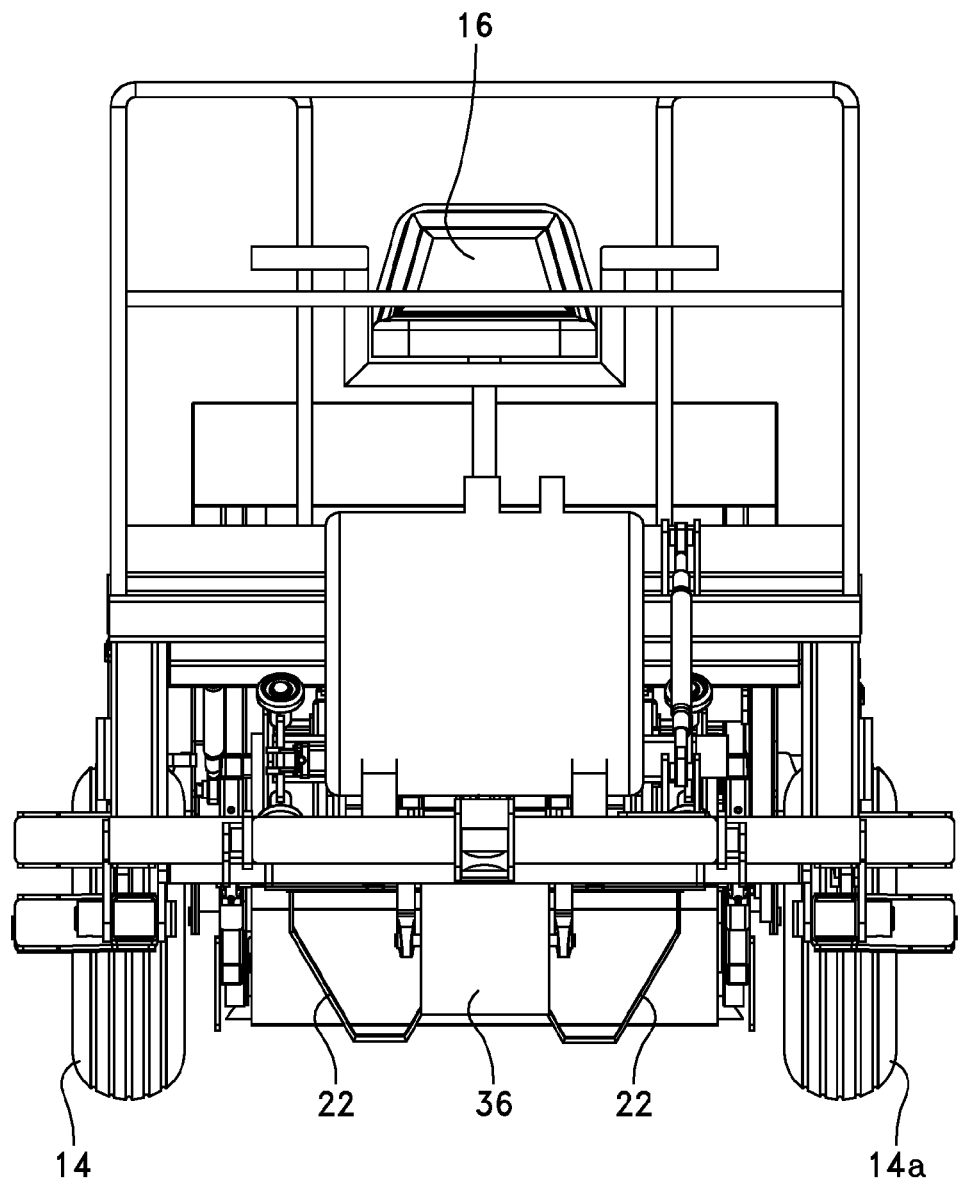
FIG. 4 is a front view of one embodiment of a crown mulcher of the present invention.

FIG. 4 provides a front view of one embodiment of a crown mulcher 10 of the present invention. Clearly shown are gauge wheels 14, ground following wheel 36, oscillating blades 22, and draper wheel 32 (indicated in FIG. 5). In the embodiment of crown mulcher 10 shown, two oscillating blades 22 are shown. In other embodiments, more than two oscillating blades 22 may be used. It is contemplated that these may be two separate structures entirely, or that a single structure may be shaped and formed to provide two discrete blade portions along the length of oscillating blade 22. Draper wheel 32 preferably turns in the same direction as gauge wheels 14 and has a plurality of flaps extending from a central axis thereof to help lift plant material onto conveyor 26.

Figure 5:
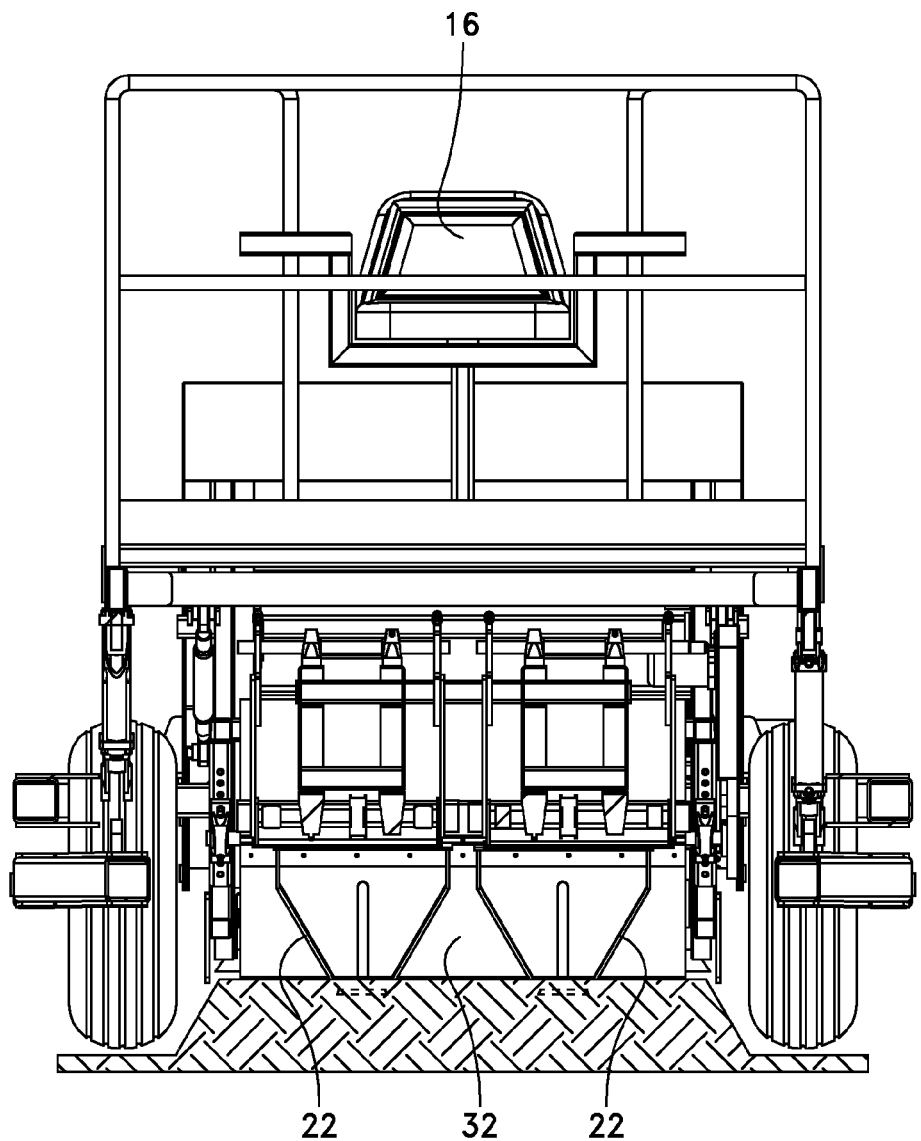
FIG. 5 is a close front view of a cutting and lifting mechanism of one embodiment of a crown mulcher of the present invention, taken along the section shown.

FIG. 5 is a close view of the oscillating blades 22 and draper wheel 32 of the present invention. The structure of oscillating blade 22, showing two separate blade portions along its length, is shown. Further, the depth of oscillating blade 22 in the soil is shown (see dashed lines). It is contemplated that the relationship between ground following wheel 36 (shown in FIG. 6) and oscillating blade 22 can be set by an operator prior to use of the device. Once set, the relationship remains constant until the operator manually changes it. Thus, as ground following wheel 36 rises and falls along the surface of the plant bed, oscillating blade 22 moves in a corresponding manner. In some embodiments of the device, draper wheel 32 includes a protective edge at the end of each flap extending from the central axis of draper wheel 32. This protects draper wheel 32 from damage due to rocks, plant material, and other debris in the plant bed. The protective edge may be constructed of metal, synthetic polymer, or any other suitable material.

Figure 6:
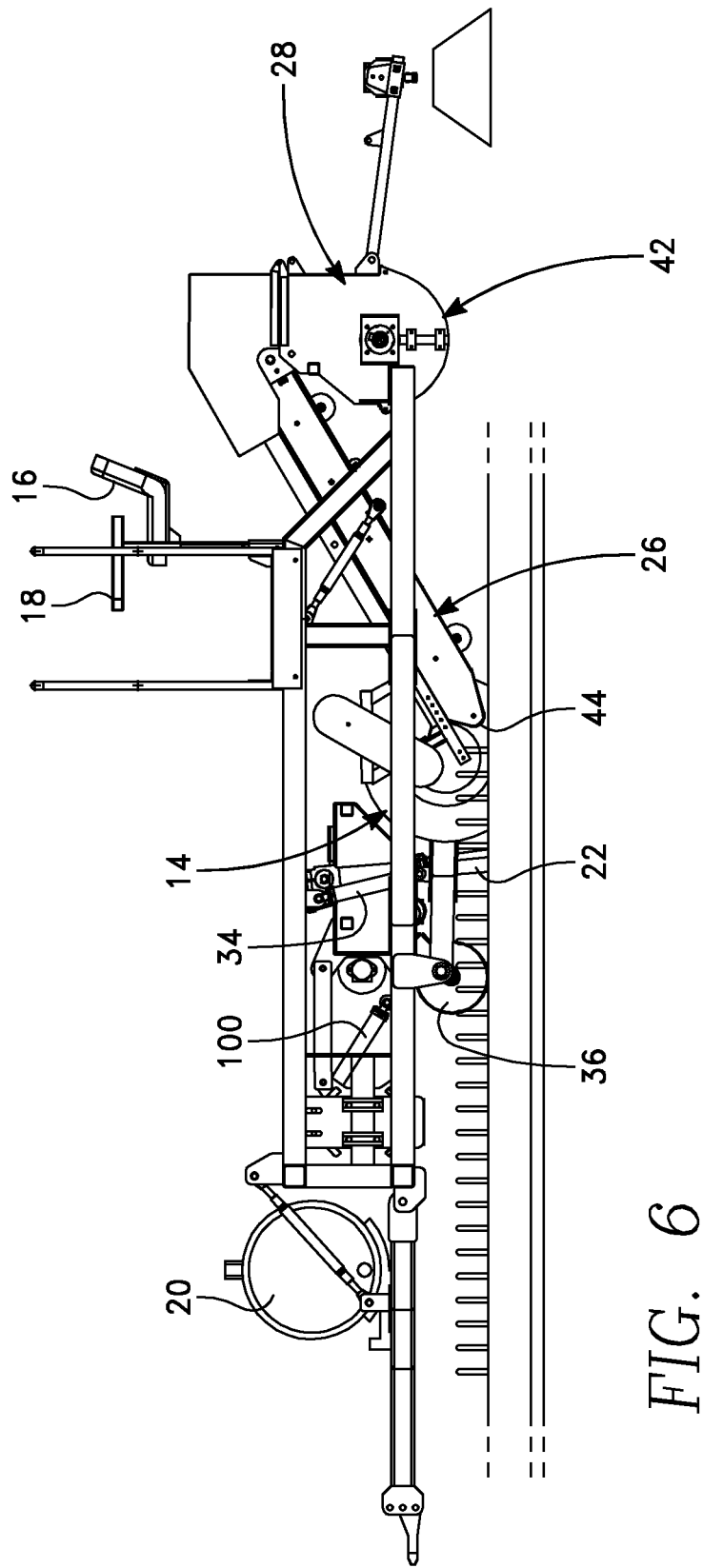
FIG. 6 is a side view of one embodiment of a crown mulcher of the present invention.

FIG. 6 provides another side view of the invention, this view from the left side of the device according to the perspective of an operator thereof. Frame 12 is shown supporting various other components of the device, including seat 16 (with operator controls 18 positioned nearby), conveyor 26, grinder 28 with grinder exit 42, oscillating blade 22, ground following wheel 36, float cylinder 34, and hydraulic oil tank 20. A gauge wheel 14 on the right side of the device is depicted in the figure. The gauge wheel on the left side of the device is not shown so that other components of the device can be illustrated more clearly, including conveyor nose 44 of conveyor 26.

A float cylinder 100 compensates for the weight of the cutting mechanism of the present invention. The degree of compensation may be controlled by the operator, allowing more or less of the weight of the cutting mechanism to impact the plant bed. This, then, affects the depth at which oscillating blade 22 extends into the soil.

Figure 7:
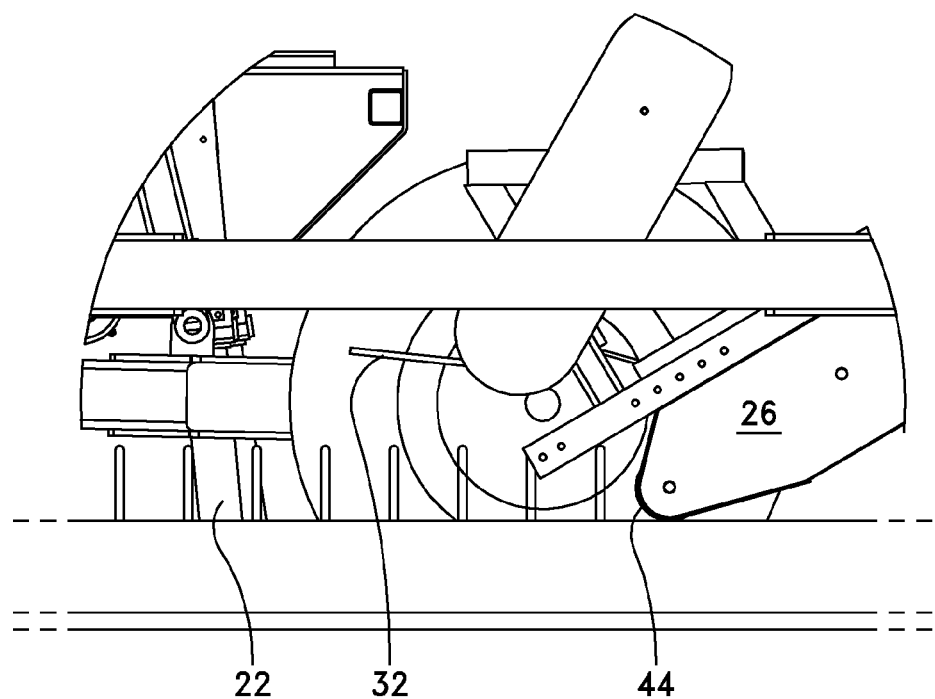
FIG. 7 is a close view showing a conveyor and cutting mechanism of one embodiment of a crown mulcher of the present invention.

FIG. 7 is a close view of a portion of the cutting and lifting mechanism of the present invention. Oscillating blade 22 is shown, and conveyor nose 44 of conveyor 26 is shown in proximity thereto. Conveyor 44 engages plant material and lifts it onto the conveyor 26. In FIG. 7, conveyor nose 44 is shown running just along the surface of the soil. Conveyor nose 44, however, preferably extends an inch or two into the soil of the plant bed, allowing it to scoop plant material cut by oscillating blade 22 and convey it to grinder 28. In some embodiments of the present invention, draper wheel 32 helps lift the plant material onto conveyor 26.

In operation, crown mulcher 10 is controlled by an operator who drives the device along the length of a plant bed. The operator can adjust the height of the cutting mechanism, and the ride height of the frame and associated components. In some embodiments, the ride height may be different on each side of the vehicle, to account for a slope or angle in the plant bed. As the operator positions the vehicle along the plant bed, oscillating blades 22 cut plant material at an appropriate depth preselected by the operator. Draper wheel 32 helps lift the plant material, which is also scooped up by nose 44 of conveyor 26. The plant material travels along conveyor 26 to grinder 28, whereupon it falls into the grinder and is processed into non-harvestable particles that fall through the grinder exit 42 and onto the ground, where they can be brushed aside in preparation for harvest of raspberry roots or strawberry daughter plants. In some embodiments of the present invention, crown mulcher 10 may be associated with another vehicle for moving crown mulcher 10 along the length of a plant bed. It is contemplated, however, that crown mulcher 10 may also be self-propelled, and that in such embodiments of the invention the operator of crown mulcher 10 may also control the speed of the device.

The depth of oscillating blades 22 may be varied according to the needs of the operator. This may depend on a variety of factors, including the type of plant in the plant bed. For example, with respect to raspberries, the height is set to maximize the amount of plant root left in the ground. Generally, the depth of oscillating blades 22 will be no more than two inches in this case, though other depths may be used. In the case of strawberries, however, the goal is to destroy "mother plants" as completely as possible, and the depth is set with this goal in mind. Other depths may be more suitable for other plants.

Figure 8:
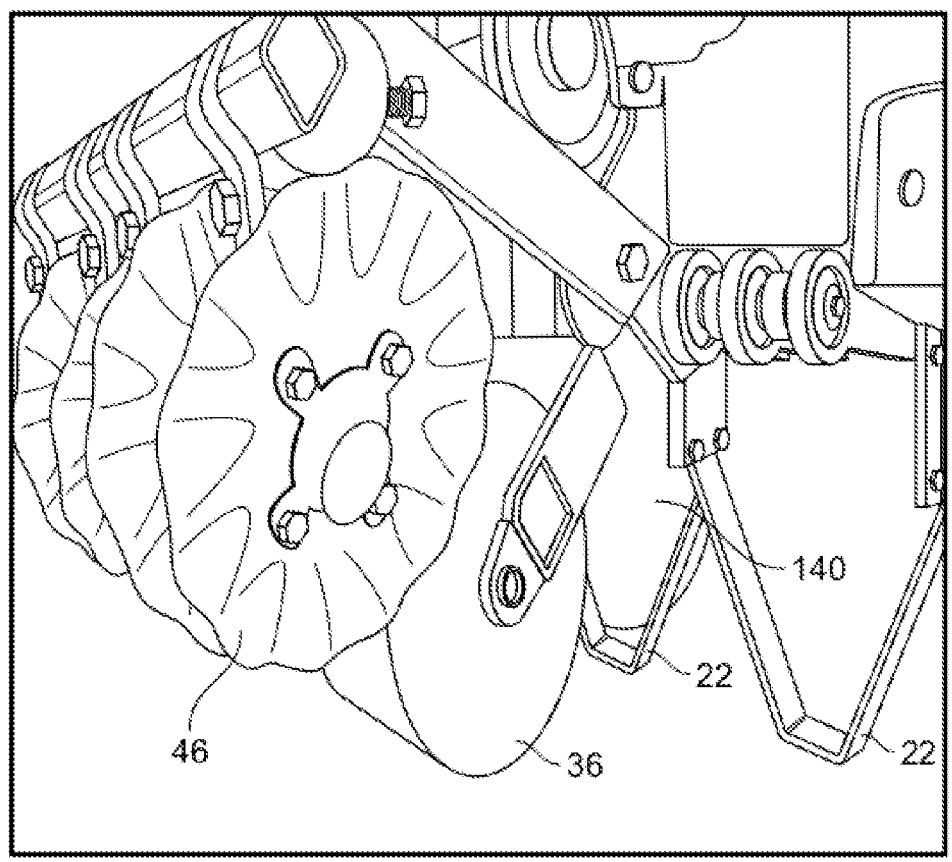
FIG. 8 is a close view of an embodiment of the present invention including disc hillers to aid in cutting and lifting of plant material.

Some embodiments of the present invention may utilize disc hillers 46 in order to cut and lift plant material, rather than relying on a draper wheel. Such variations may be more useful with respect to some plants than others. For example, the use of disc hillers 46 may be more useful with respect to strawberries than raspberries. FIG. 8 depicts an embodiment of the present invention employing disc hillers 46.

It is to be understood that the foregoing description and accompanying drawings are exemplary and detail certain embodiments of the present invention. Various modifications to the embodiments shown will be readily apparent to those of skill in the art upon reading this disclosure, and such modifications are considered to be within the spirit and scope of the invention.

Having thus described the preferred embodiment of the invention, what is claimed as new and desired to be protected by Letters Patent includes the following:

1. A device for removing plant material from a plant bed, the device comprising:
   a frame;
   an oscillating cutter attached to said frame, the oscillating cutter disposed such that a cutting portion thereof is beneath the surface of the soil of the plant bed when the device is in use;
   a conveyor attached to the frame, the conveyor having a nose, wherein as the device moves along a plant bed having plant material disposed therein, the oscillating cutter cuts the plant material, the nose of the conveyor scoops the plant material from the soil, and the conveyor conveys the plant material to a desired location;
   a grinder attached to the frame at an end of the conveyor opposite the conveyor nose, such that plant material traveling along the conveyor is introduced into the grinder; and
   at least one brush for sweeping particles from the grinder off of the plant bed.

* * * * *